Dec. 16, 1941.  E. A. TUBBS  2,266,668
UNDAMPED WAVE GENERATOR
Filed April 6, 1938  3 Sheets-Sheet 1
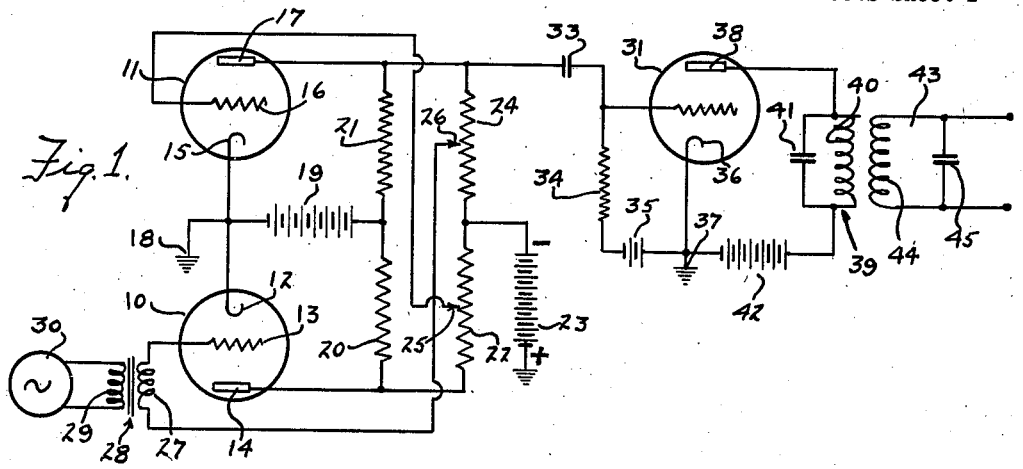
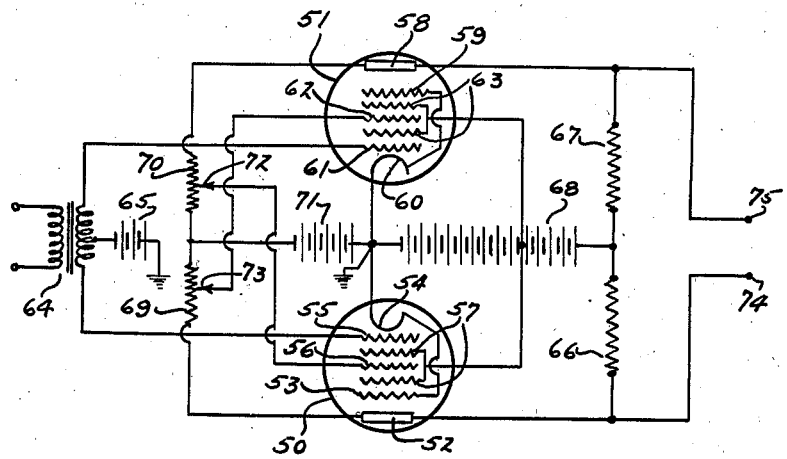
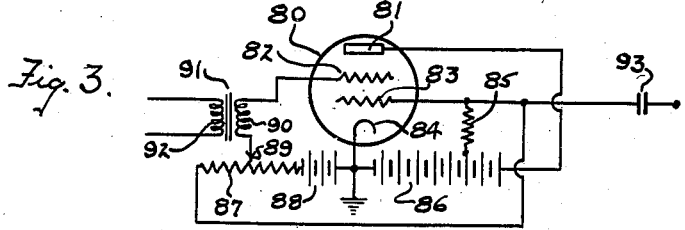
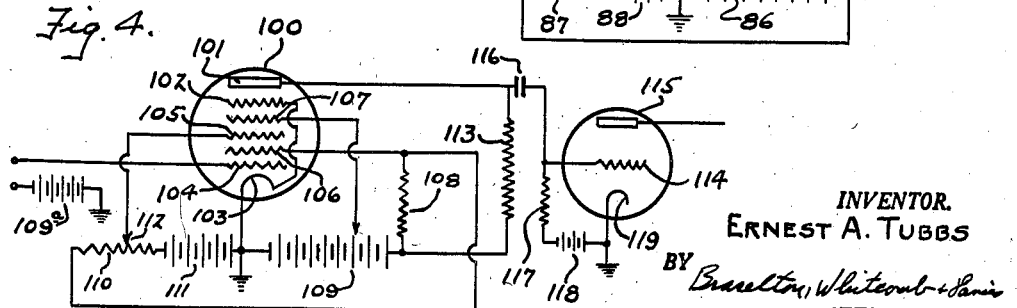
INVENTOR.
ERNEST A. TUBBS
BY Braselton, Whitcomb + Hanis
ATTORNEYS.

Dec. 16, 1941.  E. A. TUBBS  2,266,668
UNDAMPED WAVE GENERATOR
Filed April 6, 1938  3 Sheets-Sheet 2
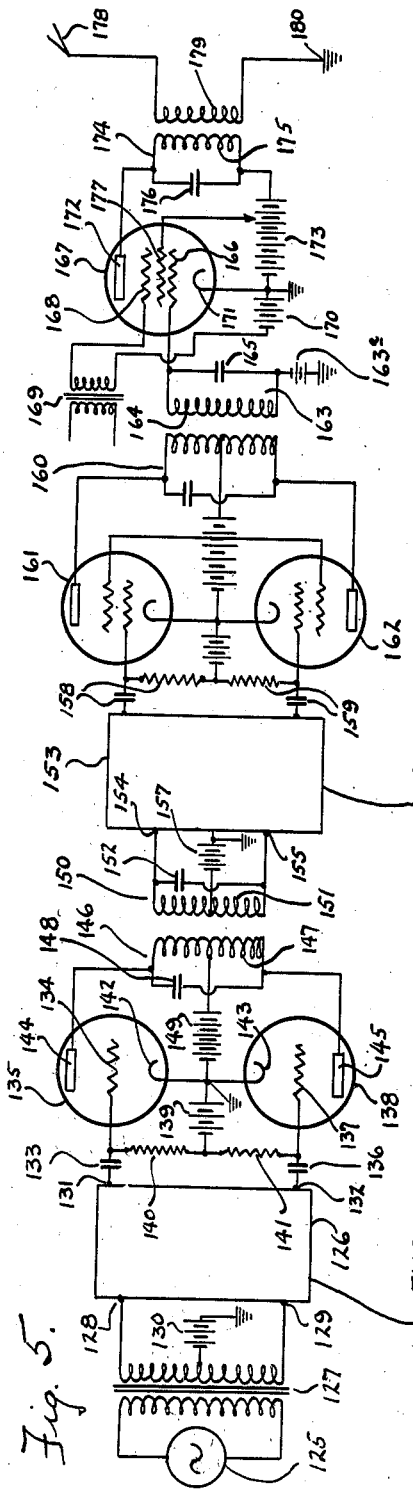
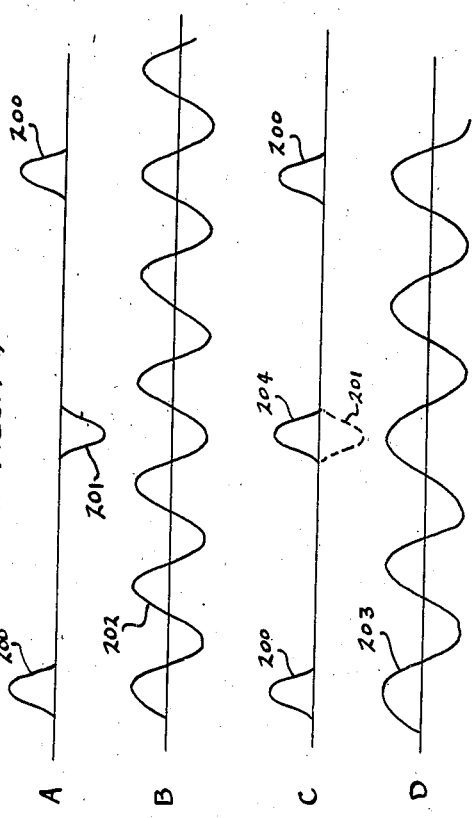
INVENTOR.
ERNEST A. TUBBS.
BY
Braselton, Whitcomb & Davis
ATTORNEYS.

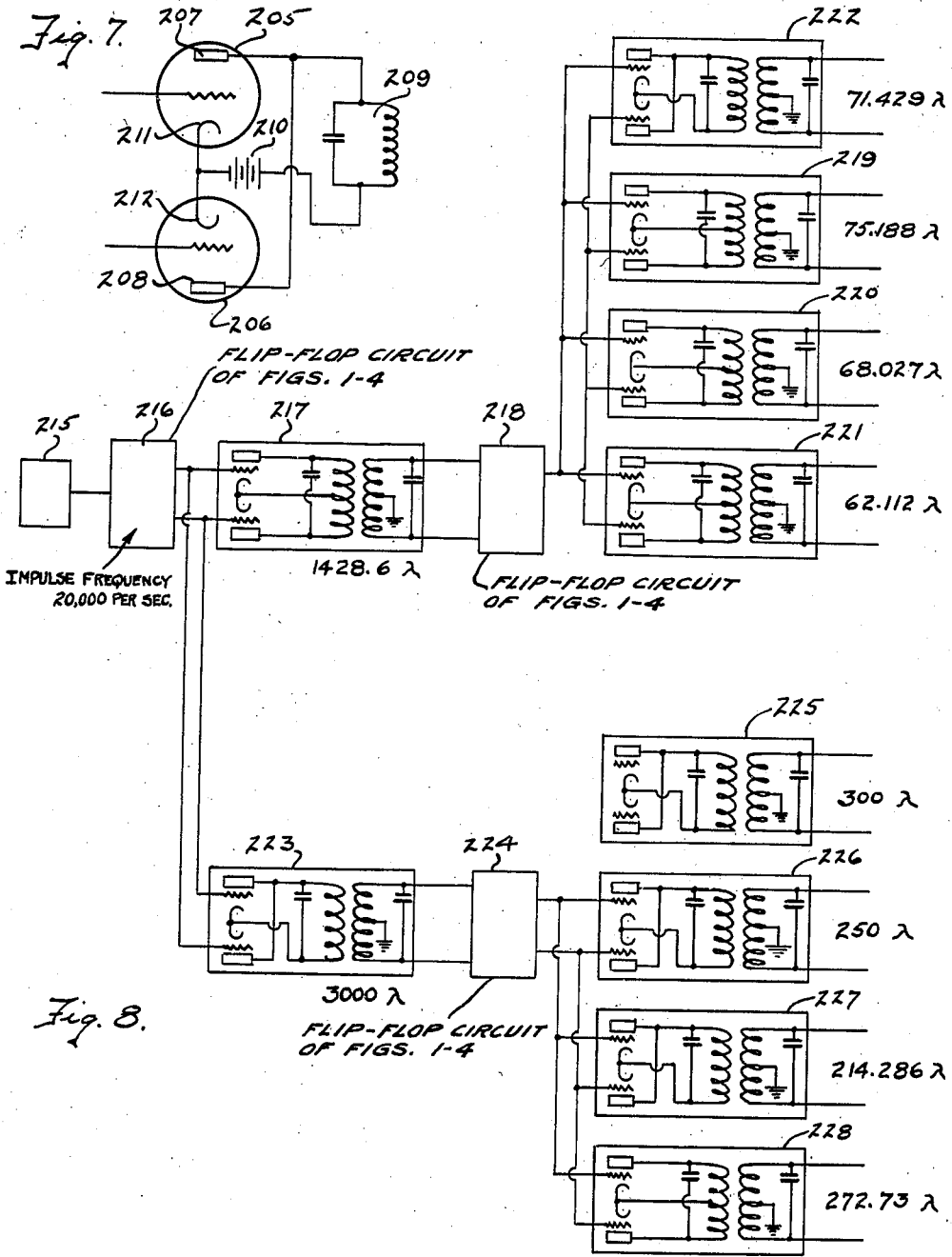

Patented Dec. 16, 1941

2,266,668

UNITED STATES PATENT OFFICE 2,266,668

UNDAMPED WAVE GENERATOR

Ernest A. Tubbs, Long Island City, N. Y., assignor to National Television Corporation, Wilmington, Del., a corporation of Delaware Application April 6, 1938, Serial No. 200,338

14 Claims. (Cl. 250—36)

This invention relates to undamped wave generators and to a signalling system incorporating such generators. The particular generator of the invention is based on a discontinuity circuit which has other desirable features to be hereinafter described.

In the early development of signalling by means of electro-magnetic waves, high frequencies were generated by means of a so-called quenched spark-gap transmitter in which alternating current at a low frequency was caused to discharge across a spark-gap which was included in a circuit having a condenser and a coil, the latter being coupled to an antenna which was tuned to the desired wave length. The spark gap was, in effect, a means to create a discontinuity of the initiating circuit inasmuch as no current would flow through the gap until the voltage was sufficient to break down the resistance of the gap, and current would cease to flow when the voltage could no longer maintain the current across the resistance of the gap. This caused an impulse to be created each time the spark jumped across the gap. These impulses were used to shock a secondary or antenna circuit into oscillation having a wave length determined by the tuning of the antenna circuit. Inasmuch as the impulses of the spark-gap lasted a shorter time than the resulting oscillations in the antenna or secondary circuit, the oscillations of the secondary circuit had a tendency to die out, following a well known law, between the initiating impulses. If the rate of the impulses set up by the spark gap was such that the oscillations in the secondary or antenna circuit were not permitted to die down appreciably between initiating or shocking impulses from the spark gap, and if those impulses had the proper phase relation, the resulting oscillations were substantially constant.

In such a circuit the chosen period of the impulses originating at the spark gap for oscillations of a given wave length in the secondary circuit will depend largely on the amount of damping in the secondary circuit. If this circuit is loosely coupled to the primary circuit and otherwise designed for extremely low damping, the number of oscillations in the secondary circuit may be increased for each impulse of the spark-gap without materially decreasing the amplitude of the oscillations between spark-gap impulses. There is some leeway, therefore, in determining the impulse frequency necessary to produce the desired undamped oscillation.

This system of impulse excitation for the generation of undamped oscillations was investigated by numerous experimenters, including E. L. Chaffee and is described on page 184 of "Wireless Telegraphy" by Dr. J. Zenneck, 1915 edition.

The present invention makes use of the principles described in the above publication, but in place of the spark gap used by Chaffee, applicant has provided a thermionic tube circuit which he has termed a "flip-flop" circuit and which produces the discontinuity produced by the old spark-gap of Chaffee but in a much more uniform and controllable manner and at substantially any speed so that pure frequencies of any desired wave form may be generated. Chaffee and the other early experimenters were limited in the rapidity of the impulses produced by the spark-gap owing to the deionization time of the spark-gap, while with my thermionic tube circuit these limitations are substantially removed.

It is therefore one of the objects of the present invention to provide a high frequency generator which is extremely stable and easy to adjust.

Another object of the invention is to provide a generator by means of which waves of predetermined shape and form may be produced.

Still another object of the invention is to provide a high frequency generator having a controlled discontinuity action.

Still another object of the invention is to provide a flip-flop circuit in which the controlling impulse may be electrically separated from the discontinuity operation.

Another object of the invention is to provide an undamped wave generator in which a thermionic tube is caused to produce a discontinuity action which results in practically ideal initiating impulses to shock an output circuit into oscillation at a desired predetermined frequency.

Still another object of the invention is to provide a high frequency generator using a single thermionic tube with a discontinuity factor.

Another object of the invention is to provide a signalling system using impulse excitation for carrier wave generation which is extremely stable and easy to adjust.

Still another object of the invention is to provide a flip-flop circuit using a single thermionic tube with means incorporated in the tube to so isolate the output circuit that it does not affect the flip-flop circuit.

Still another object of the invention is to provide an impulse excitation generator which produces impulses of such shape and polarity that a multiplicity of oscillations of different wave lengths can be produced from such impulses.

Another object of the invention is to provide means to produce a multiplicity of oscillations of different wave lengths from the impulse described in the paragraph above.

Still another object of the invention is to provide a chain of flip-flop circuits, each one initiating a different impulse frequency.

Still another object of the invention is to provide a flip-flop circuit with a push-pull input connection for producing a more symmetrical action.

Another object of the invention is to provide a flip-flop circuit using a single tube having negative mutual conductance.

Other objects and advantages especially relating to the various circuit combinations and methods of controlling the circuits will be apparent as the description of the invention proceeds.

The invention has been illustrated in the accompanying drawings, in which;

Fig. 1 is a circuit diagram of one form of my improved undamped wave generator using three thermionic tubes;

Fig. 2 is a circuit diagram of an improved form of the impulse generator of Fig. 1 having certain advantages thereover;

Fig. 3 is a circuit diagram of another modified form of the impulse generator using a single multi-grid tube;

Fig. 4 is a circuit diagram of an improved form of the impulse generator of Fig. 3 using a multi-grid tube;

Fig. 5 is a circuit diagram of a complete transmitter using my improved system of carrier wave generation;

Fig. 6 is a diagrammatic illustration of oscillations with their driving pulses;

Fig. 7 is a circuit diagram of an alternative output connection for the flip-flop circuit; and Fig. 8 is a block diagram of a chain of flip-flop circuits for producing a plurality of different waves.

Referring now to Fig. 1 of the drawings, a simple form of the undamped wave generator has been shown which makes use of two three-electrode tubes 10 and 11, the former having a cathode 12, a grid 13 and a plate or anode 14, while the latter has a cathode 15, a grid 16 and an anode 17. The two cathodes 12 and 15 may be connected together and to ground, as indicated at 18. Both the plates 14 and 17 may be given a positive potential by means of the battery 19, the former through a resistor 20 and the latter through a resistor 21, the battery having its negative terminal connected to the cathodes.

The plate 14 of the tube 10 may also be connected through a resistance 22 to the negative side of a biasing battery 23, the positive side of which may be grounded, and the plate 17 of the tube 11 may be connected through a resistance 24 also to the negative side of the battery 23.

As the positive side of the biasing battery 23 is connected to the negative side of the battery 19 through ground, a bridge circuit is thus formed, one branch including the two batteries, the resistance 21 and the resistance 24, and the other including the two batteries and the resistances 20 and 22. If the components of this bridge be properly chosen there will be some point on both the resistances 22 and 24 which is at ground potential, or, if desired, slightly negative from ground potential. Such a point 25 on the resistance 22 I may connect directly to the grid 16 of the tube 11, and such a point 26 on the resistance 24 I may connect directly to the grid 13 of the tube 10 through the secondary 27 of a transformer 28, the primary 29 of which may be connected to a generator 30. The generator 30 may be any source of uniformly varying potential.

In order to understand the operation of this device let us assume that the grid 13 is given a negative potential by means of the generator 30 through the transformer 28. This reduces the current flow between the cathode 12 and the plate 14, which in turn decreases the potential drop across the resistance 20 and thereby raises the potential on the plate 14. The plate 14 is also connected to the grid 16 of the tube 11 through the portion of the resistor 22 between the plate 14 and the point 25, and therefore the grid 16 is given a potential in the positive direction. This increases the current flow between the cathode 15 and the plate 17 of the tube 11. As this current flow increases the drop in potential across the resistor 21 increases and the potential of the plate 17 therefore decreases. As this plate 17 is directly connected to the grid 13 of the tube 10 through a portion of the resistance 24 and the secondary 27 of the transformer 28, the grid 13 will tend to decrease in potential. This in turn, as already explained, causes an increase in the potential of the grid 16 and thus there is a cumulative effect, causing the grid 13 of the tube 10 to become so negative that a minimum current will flow between the cathode 12 and plate 14 and the grid 16 of the tube 11 to reach its maximum potential in the positive direction, causing the maximum amount of current to flow between the cathode 15 and the plate 17.

Now if the grid 13 of the tube 10 is made positive by means of the action of the generator 30 the cumulative operation first described will work in the opposite direction. In other words, current between the cathode 12 and the plate 14 will increase, thus decreasing the potential of the plate 14 and therefore decreasing the potential of the grid 16 which is directly connected to it. This decreases the current flow in the tube 11 with the result that the potential of the plate 17 increases and therefore the potential of the grid 13 which is directly connected to the plate 17 also increases. Thus the tube 10 builds up to maximum current flow and the tube 11 goes in the other direction to a minimum current flow.

It will thus be seen that in operation when the generator 30 has produced a predetermined negative potential on the grid 13, both tubes immediately lock up in a direction which gives the lowest possible potential on the plate 17 of the tube 11, while when the generator has produced a predetermined positive potential on the grid 13, both tubes lock up to give the highest potential on the plate 17. On the plate 17, therefore, there will be produced a square top voltage wave, rising instantaneously from a minimum to a maximum as the current drops in the tube 11, maintaining that maximum until the generator 30 has caused the potential of the grid 13 to act in the other direction, whereupon it drops to its minimum, and then holding the minimum value until the generator 30 changes the grid potential in the other direction again. If the generator 30 be disconnected the tubes will stay locked in one or the other position.

In order to use the output of the combined circuit of tubes 10 and 11 without materially interfering with the action of the tubes as already described, I may provide another three-element tube 31, the grid 32 of which may be connected through a condenser 33 to the plate 17 of the tube 11, and a grid leak 34 may be connected in series with a biasing battery 35 between the grid 32 and the cathode 36, which may also be connected to ground at 37.

The values of the condenser 33 and resistance 34 may be chosen in such a manner as to differentiate the square top waves, already referred to, to form sharp impulses at the time of the tripping of the tubes 10 and 11 which are therefore applied to the grid 32. There will be two impulses for each cycle, one positive and one negative, and the latter impulses may be eliminated by suitable adjustment of the bias of that grid by means of the battery 35. Thus a positive impulse may be given to the grid 32 for every time that the plate 17 becomes more positive. There will thus be one sharp impulse for each cycle of the generator 30 impressed on the grid 32.

The plate 38 of this tube may be connected through an oscillatory circuit 39, which may comprise a coil 40 and condenser 41, and through a suitable source of potential as, for instance, the battery 42, to the cathode 36. If, therefore, the grid 32 be held sufficiently negative by the battery 35 so that current can only flow between the plate and cathode when the grid is given a positive impulse, then the impulse produced with plate current will shock the oscillatory circuit 39 into oscillation, whereupon the action of the grid bias will in effect open the plate circuit and allow the oscillatory circuit to freely oscillate at its natural period. The oscillations thus started will continue with decreasing amplitude for a length of time depending on the damping of the oscillatory circuit in accordance with a well known law. In order to produce substantially undamped oscillations in this circuit I again produce the shocking impulse in proper phase before the oscillations have appreciably changed in amplitude. This is in accordance with the well known theory, as outlined on page 184 of the publication above referred to.

As already explained the impulse frequency of the flip-flop circuit which corresponds to the spark frequency of the early experimentation and the other variables of the circuits are so chosen that oscillations in the resonant circuit 39 will not die down appreciably between impulses received on the grid 32. The additional tuned circuit 43, having a coil 44 and condenser 45, may be loosely coupled to the resonant circuit 39 and may be tuned to the same desired frequency. The oscillations transferred to this resonant circuit 43 will then have even more uniformity as suggested on page 186 of the above mentioned publications. If desired, additional coupled circuits may be used to still further eliminate the effect of the oscillation dying out in the resonant circuit 39.

If the damping of the oscillatory circuits be so high as to allow the oscillations to die down an objectionable amount between available excitation impulses, then I may decrease the damping of the oscillatory circuits, add more oscillatory circuits, or increase the impulse frequency. If, for example, the wave length of the undamped oscillation which can be produced by the circuit 43 of Fig. 1 be longer than that desired, these oscillations may be used to control an additional flip-flop circuit, thereby giving a higher impulse frequency which in turn may be used to excite another oscillatory circuit of the desired short wave length.

I have mentioned the fact that the negative impulse on the grid 32 of the tube 31 may be entirely eliminated by the adjustment of the bias of the grid of that tube. This may be because these negative impulses are not in phase with the desired oscillation set up in the coil 39, and for that reason are preferably suppressed. In some instances, to be explained later, I may desire to use this negative impulse, and in this case the grid may be biased so that the tube acts as a normal amplifier. In this case also it is preferable to use a high impedance tube so as to produce the minimum amount of damping on the oscillatory circuit.

For this reason I may prefer to use the multi-grid tubes shown in Fig. 2. In this circuit two tubes 50 and 51 are shown. These tubes may be of the number 6L7 type, the tube 50 having an anode 52, a suppressor grid 53, which may be connected to the cathode 54 within the tube, a first control grid 55, a second control grid 56, and two screen grids 57 which may be connected together and which electrically isolate the second control grid 56. Similarly the tube 51 may have an anode 58, a suppressor grid 59 which may be connected to the cathode 60, a first control grid 61, a second control grid 62, and two screen grids 63 which may be connected together and which electrically isolate the second control grid 62.

The input, which may be supplied by any suitable generator as before, may be connected to the primary of the transformer 64, the secondary of which may be connected between the first control grids 55 and 61 of the tubes 50 and 51, the midpoint of the secondary being grounded through a suitable biasing battery 65 which has its positive side connected to ground. The input voltage variations are therefore applied to the tubes in the manner of a push-pull circuit which may be preferred, but they might be applied to only one grid if desired.

The anodes 52 and 58 may be connected, respectively, through resistors 66 and 67 to the positive terminal of a battery 68, the negative terminal of which may be connected to the two cathodes 54 and 60, which may also be grounded. Also the anodes 52 and 58 may be connected, respectively, through resistances 69 and 70 to the negative side of a common battery 71, the positive side of which may be connected to the cathodes 54 and 60. The second control grids 56 and 62, respectively, of the tubes 50 and 51 may then be connected, respectively, to the desired points 72 and 73 on the resistances 70 and 69. The output of the circuits may be from the two plates 52 and 58, indicated at terminals 74 and 75, respectively.

The flip-flop operation of this circuit of Fig. 2 is fundamentally similar to that already described in connection with Fig. 1, with the exception that the input circuit is maintained independent of the flip-flop action. Thus, when the first control grid 55 of the tube 50 is made negative by the action of the input generator, the control grid 61 of the tube 51 is made positive. This tends to reduce the plate cathode current of the tube 50 and to increase the plate cathode current of the tube 51. Decreasing the plate cathode current of the tube 50 tends to increase the potential of the grid 62 of the tube 5l to which it is directly connected, thereby tending to increase the current in the tube 5l. Increase of the current in the tube 5l decreases the potential on the plate 58 and therefore tends to decrease the potential on the second control grid 56 of the tube 50 to which it is directly connected, thereby tending to decrease the plate cathode current of that tube.

Thus, there is a tendency for the plate cathode current of the tube 50 to be reduced to a minimum and the plate cathode current of the tube 5l to reach its maximum when the potentials of the grids 55 and 6l are as assumed. These potentials, when reversed, act in the opposite direction to produce a minimum amount of plate cathode current in the tube 5l, and a maximum amount in the tube 50.

If the positive and negative impulses produced by one tube are not similar because of the characteristics of the tube, they are also not similar in the other tube but while the tube 5l is producing a positive impulse the tube 50 is producing a negative impulse and vice versa. Therefore, the dissimilarity is cancelled out so that both the positive and negative impulses produced by this arrangement are equal although opposite in direction. The push-pull input arrangement assures that the pulses from the two tubes will be the same. This makes it possible to use both of these impulses for producing certain desired oscillations in an associated circuit by shock excitation, as will be subsequently described in connection with Fig. 5.

While I have shown two tubes in the flip-flop circuits of Figs. 1 and 2, I have found that it is possible to obtain satisfactory results with single tubes. Thus in Fig. 3 I have shown a four-element tube 80, having an anode 8l, a grid 82, a second grid 83, and a cathode 84. The grid 83 may be given a positive potential through a resistor 85 and a portion of a battery 86, the negative side of which may be connected to ground and to the cathode 84. The anode 8l may also be given a positive potential from the battery 86 to which it may be directly connected. The grid 83 may also be connected through a high resistance 86 and a battery 88 to ground and to the cathode 84, the positive side of the battery 88 being connected to the cathode. A point 89 on the resistance 87, which has approximately cathode potential, may be connected through a secondary 90 of an input transformer 9l to the grid 82, the primary 92 of the transformer being connected to any source of input energy.

Assuming a negative potential on the grid 82, as set up by the action of the transformer 9l, there will be less cathode plate current flowing in the tube 80, and inasmuch as the grid 83 is positively charged there will be grid current flowing through the resistance 85. As this grid current increases the potential drop across the resistance 85 will increase and as this grid is directly connected through a portion of the resistance 87 to the grid 82 the potential on the grid 82 will tend to decrease, i. e. become more negative, thus again decreasing the plate current of the tube. This action causes the plate current of the tube to instantaneously lock at a minimum.

A positive potential on the grid 82, caused by the action of the transformer 9l, increases the plate cathode current of the tube, and as more current will flow through the plate circuit, the grid 83 will have less current in its circuit. This will cause a less potential drop across the resistor 85 with the result that the grid 83 will increase in potential which in turn will increase the potential of the grid 82, thus increasing the plate current of the tube, and the tube will instantaneously lock in a condition of maximum plate current. The wave of maximum and minimum potentials thus produced may be taken from the grid 83 by means of a condenser 93 and may be used in causing shock excitation of a suitable resonant circuit as already described in connection with Fig. 1.

I have found it preferable not to use the plate circuit in this type of tube inasmuch as an appreciable load on the plate circuit will affect the flip-flop operation.

In Fig. 4 a greatly improved modification of the single tube flip-flop circuit of Fig. 3 is shown, having the input circuit independent of the flip-flop action and the flip-flop circuit independent of the output action. This arrangement makes use of a multi-grid tube 100, having an anode 10l, a suppressor grid 102, which may be connected to the cathode 103, a first control grid 104, a second control grid 105, an output grid 106 between the control grids 104 and 105, and a screen grid 107 between the suppressor grid 102 and the control grid 105. This tube may have elements exactly the same as the number 6L7 tube, described in connection with Fig. 2, but instead of the two screen grids being connected together, I preferably provide independent leads for them. In this case I may use the grid 106 in place of the grid 83 in Fig. 3 and give it a positive potential through a resistance 108 from a battery 109, the negative side of which may be connected to the cathode 103. The first control grid 104 may be connected to the input circuit through a battery 109a, the positive side of which may be connected to ground as indicated.

I may also connect the grid 106 through a high resistance 110 and a battery 111 to the cathode 103, the battery 111 having its positive terminal connected to the cathode. A point 112 on the resistance 110 having substantially cathode potential may then be connected to the second control grid 105. The grid 107 may correspond to the anode 8l of Fig. 3 and be given a positive potential by directly connecting to the battery 109.

The circuit just described, omitting completely the anode 10l, will operate exactly like the arrangement of Fig. 3, except for the independent input grid 104. The anode 10l, therefore, may be connected through a resistance 113 to the battery 109, and it may then be connected to the grid 114 of a suitable output tube 115 by means of a condenser 116. A grid leak 117 may be connected in series with a biasing battery 118 between the grid 114 and the cathode 119. The values of the condenser 116 and grid leak 117 may be so chosen, if desired, as to produce the differentiating effect already described in connection with Fig. 1.

The following values used with this circuit have been found to give good results: Input grid 104—3 volts; total of battery 109, 200 volts; resistance 108, 10,000 ohms; resistance 110, 150,000 ohms; battery 111,—100 volts; screen grid 107, 50 volts; anode 10l, 200 volts.

An important fact about the circuit just described is that the internal action of the tube as determined by the potential of the input flip-flop grid produces a potential on the output flip-flop grid which is always in phase with the potential on the input flip-flop grid. With respect to these two grids, therefore, the mutual conductance is negative.

In Fig. 5 I have shown my improved undamped wave generating circuits used in a complete radio transmitter for transmitting intelligence by means of a modulated carrier wave.

The alternating current generator 125 may be fed into the first flip-flop stage 126 by means of a transformer 127. The first flip-flop stage 126 may be similar to that described in connection with any of the preceding figures. I have shown it, however, as arranged for push-pull operation, similar to Fig. 2, in which case there will be a double input connection 128 and 129 for the flip-flop input grids with a neutral connection through the battery 130 to ground, and two output connections 131 and 132. I may connect the output connection 131 through a condenser 133 to the grid 134 of a tube 135, while the output connection 132 may be connected through a condenser 136 to the grid 137 of a tube 138. The grids 134 and 137 may be connected to the negative side of a battery 139 through two resistors 140 and 141 respectively. The positive side of the battery 139 may be connected to the cathodes 142 and 143 of the tubes 135 and 138 respectively, which may be connected together and to ground, as shown.

The plates 144 and 145, respectively, of the tubes 135 and 138 may be connected to opposite ends of a resonant circuit 146 comprising a coil 147 and a condenser 148, the midpoint of the coil 147 being connected to the positive end of a battery 149, the negative side of which may be connected to the cathodes 142 and 143.

As has been stated in connection with Fig. 1, the condenser 133 and grid leak 144 may be given such values that differentiation takes place and the grid 134 may therefore be supplied with very sharp impulses, those in a negative direction being eliminated, if desired, by biasing the grid to cut off by means of the battery 139. Inasmuch as the tube 138 is oppositely connected, the negative impulses introduced to the grid 134 of the tube 135 will be positive impulses on the grid 137 of the tube 138, and positive impulses on the grid 134 will be negative on the grid 137. By this means the impulse in one direction is produced by the tube 135 and in the other direction by the tube 138; therefore, with the arrangement shown, there are two impulses applied to the resonant circuit 146 for each cycle of the generator 125.

The two impulses per cycle of the initiating frequency produce oscillations in the resonant circuit 146 by shock excitation. Thus continuous oscillations may be set up in this oscillatory circuit which may be inductively or otherwise transferred to another oscillatory circuit 150 having a coil 151 and a condenser 152 which may also have the same material period as the circuit 146. The coupling between the oscillatory circuits may be made sufficiently loose so that an even more constant oscillation is set up in the circuit 150.

The oscillations in the circuit 150 may be applied to a second flip-flop circuit 153 by connecting the opposite ends of the oscillatory circuit to the flip-flop input grid terminals 154 and 155 and the mid-point of the coil 151 to ground through the biasing battery 157, the negative side of which may be towards the midpoint of the coil.

The flip-flop circuit 153 is now provided with a higher initiating frequency than was the first flip-flop circuit 126, and it operates in exactly the same manner to produce the discontinuous action, thereby creating the waves which may again be differentiated by means of condenser and grid-leak combinations 158 and 159, thus forming a new and higher impulse frequency which may be applied to the oscillatory circuit 160 through the screen grid tubes 161 and 162. Inasmuch as the equivalent spark frequency is now higher than that from the first flip-flop circuit, the oscillation circuit 160 may be adjusted to a shorter wave length than the oscillatory circuit 146 without any danger of the oscillations decaying appreciably between excitation impulses. Any number of the flip-flop circuits may be used, depending on the particular application.

If the wave length at which it is desired to transmit has been reached in the oscillatory circuit 160, this may be coupled inductively or otherwise to another oscillatory circuit 163 which may comprise a coil 164 and condenser 165. One end of this circuit may be connected to the grid 166 of a thermionic tube 167 while the other end of the circuit may be connected to ground through a biasing battery 163a.

The tube 167 may be used for modulating the carrier wave, and to this end the signal to be transmitted may be introduced to the suppressor grid 168 by means of a transformer 169 as described in my Patent No. 1,977,536.

The suppressor grid may be biased by a battery 170 which may have its positive terminal connected to the cathode 171 and to ground. The anode 172 may be connected to the positive terminal of battery 173 through a tank circuit 174 which may comprise a coil 175 and a condenser 176, the negative side of the battery 173 being connected to the cathode 171. A screen grid 177 is shown provided with a positive potential from the battery 173.

The tank circuit 174 is, of course, tuned to the carrier wave and the current flowing therein will be modulated by the signal introduced to the suppressor grid. An antenna 178 may be coupled to the circuit 174 by means of a suitable coil 179, the other end of which may be grounded at 180. If desired, instead of using the antenna, the modulated carrier may be transmitted over a wire.

In Fig. 6 I have shown at A a diagram representing a plurality of the impulses which may be used to excite one of the oscillatory circuits of Fig. 5; at B the oscillation in the oscillatory circuit is represented. The impulses shown at A are alternately positive and negative, the positive ones being indicated at 200 and the negative at 201. If the number of oscillations coming between the two positive impulses is an odd number, as indicated by the sine wave 202 shown in B, then the negative impulse 201 will be exactly in phase with the negative side of one of the oscillations and therefore will aid in the maintenance of the oscillation.

At D I have shown another oscillation sine wave 203 which has an even number of waves between the two positive impulses 200 represented at C. With this arrangement it will be seen that the impulse 201, shown in dotted lines, if present as a negative impulse, would not be in phase with the oscillation at this point and would therefore tend to stop the oscillation or cause it to die down. With such an oscillation, therefore, I reverse the impulse 201 to form a new positive impulse 204 which is then in phase with the oscillation and will help to maintain it.

The push-pull arrangement shown in Fig. 5 for the oscillatory circuits 146 and 160 will produce the positive and negative impulses at A of Fig. 6. If, however, I connect the oscillatory circuit in parallel with the two output tubes, all of the pulses will then be in one direction, or positive.

In Fig. 7 I have shown a circuit for producing this effect. Two tubes 205 and 206 may correspond to the tubes associated with either flip-flop circuit of Fig. 5 or with the circuit of Fig. 2. Both anodes 207 and 208 of these tubes may be connected together and to one side of an oscillatory circuit 209, the other side of which may be connected through a battery 210 to the cathodes 211 and 212, which may be connected together and to ground. The result of this circuit is to produce an impulse in the oscillatory circuit 209 regardless which of the tubes 205 and 206 is initiating the impulse, so that the positive impulses of C, Fig. 6, are formed. The oscillatory circuit 209 corresponds then to the output oscillatory circuits 146 and 160 of Fig. 5.

Oscillations of a large number of different wave lengths may be obtained from the flip-flop circuits, either used alone or in combination, which may be connected together in a great variety of ways. One arrangement for producing multiple wave lengths is illustrated in Fig. 8. In this figure the circuit connections are not shown but merely diagrammatically illustrated. A generator 215 may be used to energize a first flip-flop circuit 216, which may produce, for example, an equivalent spark frequency or impulse frequency of 20,000 per second, which may be transferred in push-pull to the coupled oscillatory circuits 217. The primary of these two circuits may also be connected in push-pull. Oscillations are set up in these circuits by shock excitation, as already explained, which may be tuned, for example, to a wave length of 1428.6 meters. These oscillations may in turn be used to excite a second flip-flop circuit 218, the voltage variations of which may be transferred in push-pull to four oscillatory circuit combinations 219, 220, 221 and 222, all of which are thus shocked into oscillation. The primaries of the circuits 219, 220 and 221 may be connected in push-pull, while the primary of the circuit 222 may be connected in parallel. The circuits 219 may be tuned to a wave length of 75.188 meters, the circuits 220 to a wave length of 68.027 meters, the circuits 221 to a wave length of 62.112 meters, and the circuits 222 to a wave length of 71.429 meters.

The flip-flop circuit 216 may also be used to produce oscillations in another pair of oscillatory circuits 223 which may be tuned to a wave length of 3,000 meters, for instance. The primary of these circuits may be connected in parallel and the oscillations produced by shock excitation may be used to excite another flip-flop circuit 224 which may then be connected in push-pull to four tuned circuit combinations 225, 226, 227 and 228 which may be tuned respectively to 300 meters, 250 meters, 214.286 meters, and 272.73 meters. The circuits 225, 226 and 227 may have their primaries connected in parallel, while the circuit 228 may have its primary connected in push-pull.

With the above arrangement ten different wave lengths may be obtained. The circuits may be tuned, however, to other wave lengths than those mentioned, but, as has been pointed out before, the desired, substantially pure undamped waves are best produced when the exciting impulses come in proper phase with the oscillations. For this reason it may be desirable to maintain the equivalent spark frequency constant which may be done by stabilizing the generator 215 at a constant frequency by any of the methods well known in the art.

I wish to emphasize the fact that with my flip-flop circuit adjustments may be made so that the circuit will lock up in either direction at a predetermined value of the input grid potential. If the initiating impulses, for instance, are produced by a pure sine wave, then the flip-flop circuits will lock and unlock at exactly the same point for each cycle of the wave, and that point may be determined by the bias on the input grids, producing oscillations having low damping.

A number of tuned circuits, as shown in Fig. 8, may therefore be so resonated as to produce oscillations of different wave lengths, all of which fulfill the condition of phase relation referred to in connection with Fig. 6, and these oscillations will be substantially undamped so long as the initiating impulses continue to have this timing relation.

The amplitude and shape of the impulses produced by the flip-flop circuit may be made more uniform if both tubes of the flip-flop circuit are supplied with the input excitation, as with the push-pull arrangement of Fig. 2. The operation of the circuit of Fig. 1 may therefore be improved by providing a push-pull input for the two tubes 10 and 11.

Another important feature of the flip-flop circuit is the fact that it will always produce a uniform amplitude of output within wide variations of input amplitude. This fact adds to the great stability and easy control of the device. Also when the input circuit is disconnected or otherwise ceases to function, the output circuit ceases to produce oscillations, the flip-flop circuit remaining locked in one position or the other.

The flip-flop circuit may have other uses besides the production of substantially pure undamped waves. For instance they may be used to perform the services of a relay in which case the flip-flop circuit may be operated by any desired type of initiating impulses, regardless of the regularity thereof and of the time interval between them.

An important feature of the separate input grids of the flip-flop circuits of Figs. 2, 3 and 4 is that these auxiliary grids may be biased in such a manner that they will never draw grid current and hence may be connected to tuned circuits, for instance, without introducing objectionable damping into these circuits. The flip-flop grids themselves may become positive and therefore may draw grid current without affecting the input circuit.

I have accomplished differentiation of the square-topped wave in the various figures, by selecting certain values for the condenser and grid leak applied to the tube following the flip-flop circuit, as, for instance, the condenser 33 and grid leak 34 connected to the grid 32 of the tube 31 of Fig. 1. I wish, however, to point out that such differentiation may be accomplished by other means, as for instance, a large resistance in series with a small inductance, in a well known manner, and these means may be applied at any subsequent convenient point in the circuits between the flip-flop and the tuned circuits. Also, under certain conditions, I may eliminate the differentiating step, as it is not essential in producing the undamped waves, but may be preferred for maximum purity of output.

In the various circuits shown several types of tubes have been illustrated, but it will be understood that the circuits are subject to great variation with respect not only to the type of tube shown but to the manner of connecting these tubes. For instance, the flip-flop action may be produced with other electrodes from those mentioned, used for the connections for the input and output and flip-flop control. All of the tubes have been represented as of the heater type and the filaments have been omitted for simplicity. In some instances, however, filamentary cathodes may be used if desired. Also, where batteries have been shown in the various circuits, other well known sources of potential may be used, the batteries being merely for illustrative purposes. While in numerous cases triodes have been shown as amplifier or coupling tubes, I may prefer to substitute therefor, especially at high frequencies, tubes of the well known pentode screen grid type.

I wish to draw attention again to the fact that the flip-flop circuits described are much more stable and sure in their operation than any of the impulse excitation generators heretofore used. They operate on a discontinuity principle in which the whole circuit remains stationary between initiating impulses. The output voltage is either a maximum or a minimum and the change from one to the other is substantially instantaneous.

The device lends itself particularly to the generation of substantially undamped waves for radio transmission, although there are many other uses for it. I do not, therefore, wish to limit the use of the flip-flop circuits disclosed to generators of undamped waves, as the relay action of the device is useful also in other fields, because of its ability to remain locked in one direction until sufficiently stimulated to lock itself in the other direction.

The resonant or oscillatory circuits which are shocked into oscillation by the impulses produced in the flip-flop circuits have been illustrated as comprising coils and condensers. I do not wish to limit myself, however, to such coil and condenser combinations, as any type of oscillatory circuit may be used with equally good results. Such circuits may include electromechanical oscillatory circuits, as, for example, quartz crystals and magneto-striction rods, arranged to oscillate at a desired period and maintained in oscillation by the impulses from the flip-flop circuit which are always properly timed and in phase.

While I have shown resistances connected between the plate of one tube and the grid of the other, or those equivalent elements, in the flip-flop circuits, these resistances are solely for the purpose of applying the proper biasing potential to the grid. Any other means of maintaining this bias potential may be used, such as directly connecting the anode and grid through a battery. The expression "galvanically connected" as used in the claims is therefore intended to mean, connected in such a manner that a direct current potential may be transferred from one point to the other.

As it is desired to obtain the quickest possible cumulative action of the flip-flop circuit, I have found that in some cases, especially at high frequencies, it is an advantage to connect a small capacity in parallel with the above mentioned resistance. Care should be taken in doing this that the capacity is never of such a value that the circuit becomes unstable or breaks into oscillation. In the case of the single tube, the interelement capacity is sometimes sufficient to produce the desired result.

Modifications may be made in the circuits of the invention, and I do not wish to be limited to what has been shown and described except by the limitations included in the appended claims.

What I desire to secure by Letters Patent and claim is:

1. A flip-flop circuit comprising a pair of thermionic tubes each tube having an anode, a cathode, a control grid, and an auxiliary grid, means to galvanically connect one of said anodes to the control grid of the other tube, means to galvanically connect the other of said anodes to the control grid of the first tube, an input circuit, means to connect the input circuit in push-pull arrangement to said auxiliary grids, and an output circuit associated with one of said anodes.

2. A flip-flop circuit comprising a thermionic tube having an anode, a cathode, a control grid and an output grid, means for applying a positive potential to said output grid, a direct current connection from said output grid to said control grid, said connection being arranged in a manner to transfer the potential of said output grid to said control grid, means for applying a positive potential to said anode, means for applying an input potential to said control grid, and an output circuit connected to said output grid.

3. A flip-flop circuit comprising a thermionic tube having an anode, a cathode, a first control grid, a second control grid, an output grid, and a screen grid, an input circuit between said first control grid and said cathode, means to apply a positive potential to said anode, an output circuit connected to said anode, means to apply a positive potential to said output grid, means to galvanically connect said output grid to said second control grid, and means to directly apply a positive potential to said screen grid.

4. A flip-flop circuit comprising a thermionic tube, a cathode within said tube, a control electrode within said tube, an input circuit connected between said cathode and said electrode, a second electrode within said tube, means to apply a positive potential to said second electrode, a third electrode within said tube, means to galvanically connect said second electrode to said third electrode, a fourth electrode within said tube, means to directly apply a positive potential to said fourth electrode, a fifth electrode within said tube, an output circuit connected to said fifth electrode, and said fifth electrode being isolated from said other electrodes so as to prevent the output circuit from affecting the other electrodes in said tube.

5. An undamped wave generator comprising a resonant circuit tuned to the desired wave length, means to produce a substantially square-topped wave at a predetermined frequency, means to differentiate said wave to produce a succession of sharp pulses, and means to cause said pulses to maintain by shock excitation a substantially pure oscillation at the desired wave length of said resonant circuit.

6. An undamped wave generator comprising a resonant circuit tuned to the desired wave length, means to produce a wave having substantially vertical sides at a predetermined frequency, means to differentiate said wave to produce a succession of sharp pulses, and means to cause said pulses to maintain by shock excitation a substantially pure oscillation at the desired wave length of said resonant circuit.

7. An undamped wave generator comprising means to produce either one substantially fixed potential or another substantially fixed potential of alternate positive and negative sign, means to control said potential producing means at a predetermined rate, means to differentiate the alternate positive and negative potentials thus produced to form a succession of sharp impulses, an oscillatory circuit tuned to the desired wave length, and means to cause said impulses to maintain by shock excitation a substantially pure oscillation at the desired wave length in said oscillatory circuit.

8. An undamped wave generator comprising means to alternately produce either one substantially fixed potential or another substantially fixed potential, means to control said potential producing means at a predetermined rate, said controlling means being substantially unaffected by operation of said first mentioned means, means to differentiate the wave produced by said first mentioned means to form a plurality of impulses, an oscillatory circuit tuned to the desired wave length, and means to cause said impulses to maintain by shock excitation a substantially undamped oscillation in said resonant circuit.

9. An undamped wave generator comprising a thermionic tube having an anode, a cathode, a control grid, and an auxiliary grid, an input circuit connected between said auxiliary grid and said cathode, means to apply voltage variation at a predetermined rate to said input circuit, an output circuit connected between said anode and said cathode, means to substantially instantaneously change the potential of said control grid to produce maximum current in said output circuit when the voltage in said input circuit has produced a predetermined potential on said auxiliary grid, means to again instantaneously change the potential of said control grid so as to reduce the current in said output circuit to a minimum when the voltage in said input circuit has produced another predetermined potential on said control grid, means to differentiate the wave produced in said output circuit to form a succession of sharp impulses, an oscillatory circuit tuned to the desired wave length, and means to cause said impulses to maintain by shock excitation a substantially undamped oscillation of the desired wave length in said oscillatory circuit.

10. An undamped wave generator comprising a pair of thermionic tubes, each tube having an anode, a cathode, a control grid, and an auxiliary grid, means to connect one of said anodes galvanically to the control grid of the other tube, means to galvanically connect the other of said anodes to the control grid of the first tube, an input circuit, means to produce in said input circuit variations of voltage at a substantially constant rate, means to connect the input circuit in push-pull to said auxiliary grids, an output circuit associated with said anodes, means to differentiate the wave produced in said output circuit to form a succession of sharp impulses, an oscillatory circuit tuned to the desired wave length, and means to cause said impulses to maintain by shock excitation substantially undamped oscillations of the desired wave length in said oscillatory circuit.

11. The method of generating undamped waves which comprises producing voltage variations at a fixed predetermined rate, forming a substantially square-topped wave from said voltage variations, differentiating the square-topped wave thus formed to make a succession of sharp impulses, and causing said impulses to maintain an oscillation of the desired wave length by shock excitation.

12. The method of generating undamped waves which comprises producing voltage variations at a fixed predetermined rate, forming a wave having substantially vertical sides from said voltage variations, differentiating the waves having substantially vertical sides thus formed to make a succession of sharp impulses, and causing said impulses to maintain an oscillation of a desired wave length by shock excitation.

13. Generating apparatus comprising a flip-flop circuit having an input circuit and an output circuit, means to apply voltage variations at a predetermined constant rate to said input circuit, means to differentiate the wave produced in said output circuit to form a succession of sharp impulses, an oscillatory circuit tuned to the desired wave length, means to cause said impulses by shock excitation to maintain in said oscillatory circuit a substantially undamped oscillation at the wave length to which it is tuned, and means for supplying the output of said oscillatory circuit to a utilization circuit.

14. Generating apparatus comprising a plurality of flip-flop circuits connected in cascade, means to excite a first flip-flop circuit with voltage variations at a predetermined substantially constant rate, means to differentiate the output of said first flip-flop circuit to form a succession of sharp impulses, an oscillatory circuit connected to said first flip-flop circuit and tuned to a predetermined wave length, means to cause said succession of sharp impulses to maintain a substantially pure oscillation in said oscillatory circuit by shock excitation, means to excite a second flip-flop circuit with the oscillations thus produced, means to differentiate the output of said second flip-flop circuit to form a succession of sharp impulses, an oscillatory circuit tuned to another predetermined wave length, means to cause said last mentioned impulses to maintain oscillations of the said wave length in said second oscillatory circuit by shock excitation, and means for supplying the oscillations produced by said second oscillatory circuit to a utilization circuit.

ERNEST A. TUBBS.